United States Patent
Simmonds et al.

(10) Patent No.: US 8,107,023 B2
(45) Date of Patent: Jan. 31, 2012

(54) PROJECTION DISPLAYS

(75) Inventors: Michael D Simmonds, Ashford (GB); Louahab Noui, Tonbridge (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 12/301,696

(22) PCT Filed: Nov. 11, 2008

(86) PCT No.: PCT/GB2008/051051
§ 371 (c)(1),
(2), (4) Date: Aug. 11, 2009

(87) PCT Pub. No.: WO2009/077774
PCT Pub. Date: Jun. 25, 2009

(65) Prior Publication Data
US 2010/0246003 A1  Sep. 30, 2010

(30) Foreign Application Priority Data

Dec. 18, 2007 (EP) .................................. 07270076
Dec. 18, 2007 (GB) .................................. 0724604.4

(51) Int. Cl.
*G02F 1/1335* (2006.01)
*G02B 6/34* (2006.01)
*G02B 27/14* (2006.01)
*G09G 5/00* (2006.01)

(52) U.S. Cl. ............. 349/11; 349/5; 385/37; 385/129; 385/901; 385/36; 359/630; 359/567; 345/7

(58) Field of Classification Search ............ 349/5, 6, 349/7, 8, 11, 15; 385/37, 129, 901, 36; 359/567, 359/630, 631, 633, 634; 345/7, 8, 9; 362/600, 362/616, 618, 551, 558, 623
See application file for complete search history.

(56) References Cited

U.S. PATENT DOCUMENTS

| 5,892,598 | A  * | 4/1999 | Asakawa et al. | 359/13 |
| 7,907,342 | B2 * | 3/2011 | Simmonds et al. | 359/630 |
| 2004/0246391 | A1 * | 12/2004 | Travis | 349/6 |
| 2006/0018014 | A1 | 1/2006 | Niv | 359/407 |
| 2006/0018019 | A1 | 1/2006 | Niv | 359/566 |
| 2006/0126179 | A1 | 6/2006 | Levola | 359/563 |
| 2006/0132914 | A1 | 6/2006 | Weiss | 359/462 |
| 2009/0190222 | A1 * | 7/2009 | Simmonds et al. | 359/567 |
| 2010/0246003 | A1 * | 9/2010 | Simmonds et al. | 359/567 |

FOREIGN PATENT DOCUMENTS

| WO | 2006/106501 A1 | 1/2006 |
| WO | 2007/029032 A1 | 3/2007 |
| WO | 2007/036936 A1 | 4/2007 |
| WO | 2007/052265 A2 | 5/2007 |

OTHER PUBLICATIONS

International Report on Patentability in related application PCT/GB2008/051051 mailed Jun. 22, 2010.
British Search Report issued in GB0724604.4, Apr. 1, 2008, 6 pages.
European Search Report issued in 07270076.8, May 7, 2008, 9 pages.

* cited by examiner

Primary Examiner — Brian Healy
(74) Attorney, Agent, or Firm — Pillsbury Winthrop Shaw Pittman LLP

(57) ABSTRACT

A projection display which includes first and second waveguide elements, wherein the first waveguide element has a two input regions for injecting image bearing light into the first waveguide element. In this manner, the total field of view of the image to be displayed at the second waveguide element is divided into two sub-images prior to injection of one sub-image into one input region and the other sub-image into the other input region of the first waveguide element. This results in a smaller first waveguide element, thereby reducing obscuration of an observers view of a forward scene over which to the image to be displayed is overlaid.

21 Claims, 6 Drawing Sheets

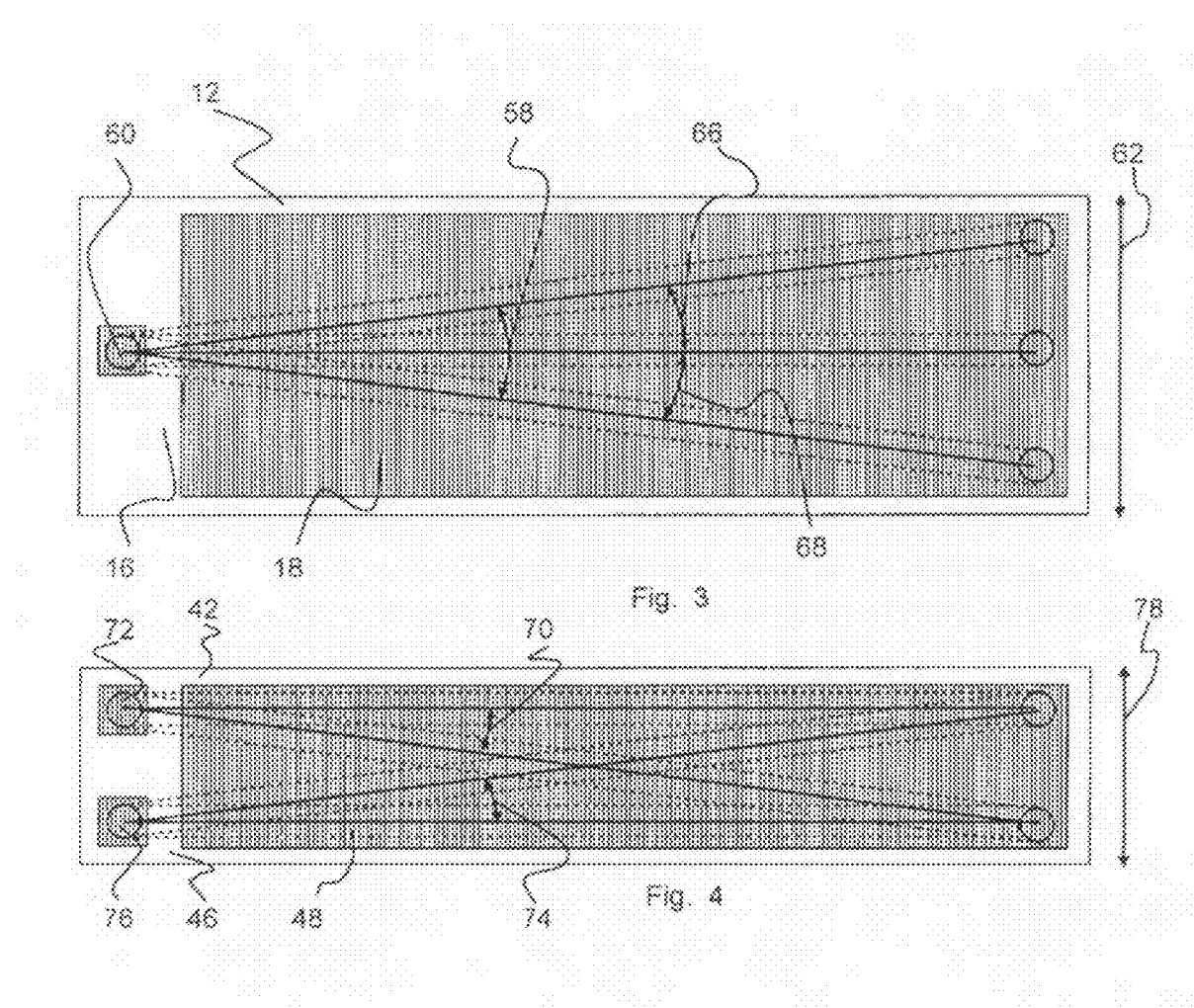

PROJECTION DISPLAYS

CROSS REFERENCE TO RELATED APPLICATIONS

This is the U.S. National Phase of PCT/GB2008/051051, filed Nov. 11, 2008, which claims priority to British Application No. 0724604.4, filed Dec. 18, 2007, and European Application No. 07270076.8, filed Dec. 18, 2007, the entire contents of all of which are incorporated herein by reference.

This invention relates to a projection display for displaying an image to an observer, which is particularly, but not exclusively, suitable for use in a head up display, a helmet mounted display or head mounted display.

Referring to FIG. 1, prior art International patent application publication number WO2007/029032 teaches a projection display 10 for displaying an image to an observer that uses waveguide techniques to generate a collimated display defining a large exit pupil at the point of an observer and a large field of view, whilst using a small image-providing light source device. The projection display uses a first plate-like waveguide 12 made of light transmissive material such as glass or plastic and a second plate-like waveguide 14 made from a light transmissive and light transparent material such as glass or plastic. The projection display 10 additional includes an image-providing light source device, not shown, located to inject image bearing light into the first plate-like waveguide 12 through a first face 16.

The image-providing light source device includes a micro-display arranged to provide information to be displayed to an observer. Additionally the image-providing light source device includes a collimating optical arrangement located between the micro-display and the first face 16 of the first plate-like waveguide 12. The collimating optical arrangement is operable to collimate light received from the micro-display and to inject the collimated image bearing light into the first plate-like waveguide 12 through the first face 16.

The collimated image bearing light produced by the collimating optical arrangement has a small exit pupil and is fed into the first plate-like waveguide 12, which performs the function of stretching the horizontal pupil of the final display. The output from the first plate-like waveguide 12 is fed into the second plate-like waveguide 14, which is arranged to stretch the vertical pupil of the final display and also to act as a combiner for the projection display 10 through which an observer views an outside world scene with information to be displayed to the observer overlaid on the outside world scene. In this manner, the image to be displayed to the observer looking through the second plate-like waveguide 14 defines a large exit pupil and a large field of view whilst using a small image generating light source.

Image bearing light injected into first plate-like waveguide 12, via first face 16 is incident on a transmission grating 18 arranged internally within the first plate-like waveguide 12 and substantially co-planar with the first face 16. Light impinging on the transmission grating 18 diffracts therefrom such that the incidence angle of the light on the internal surfaces of the first plate-like waveguide 12 is greater than the critical angle for the material from which the first plate-like waveguide 12 is made. The image bearing light is constrained within the first plate-like waveguide 12 to propagate along the first plate-like waveguide 12 reflecting from each internal surface in turn to follow a predefined light path. Thus, the relative field angles of the light incident on the first plate-like waveguide 12 at the first face 16 are preserved within the first plate-like waveguide 12 and the information required to regenerate the original image is preserved.

The transmission grating 18 also serves to output the image bearing light from the first plate-like waveguide 12. The transmission grating 18 is a low efficiency grating which diffracts a small amount of light out of the first plate-like waveguide 12 on each interaction with incident image bearing light.

The second plate-like waveguide 14 is located with a first face 20 co-planar with a second face 22 of the first plate-like waveguide 12 and is arranged to receive the image bearing light exiting the second face 22 of the first plate-like waveguide 12. The second face 22 is co-planar to the first face 16 of the first plate-like waveguide 12. The first face 20 of the second plate-like waveguide 14 is located adjacent and close to the second face 22 of the first plate-like waveguide 12. The second plate-like waveguide 14 includes a coupling grating 24 located therein arranged substantially co-planar to the first face 20 of the second plate-like waveguide 14 and the coupling grating 24 is operable to diffract each impinging ray of image bearing light received from the transmission grating 18 of the first plate-like waveguide 12 at an angle that is larger than the critical angle for the material from which the second plate-like waveguide 14 is made. Accordingly, received image bearing light will propagate inside the second plate-like waveguide 14 to follow a predefined light path. The image bearing light continues along the light path to an exit grating 26 arranged on or within the second plate-like waveguide 14, which is arranged to diffract the received image bearing light out of the second plate-like waveguide 14 towards an observer.

The coupling grating 24 is arranged such that its diffractive power is rotated through 90 degrees to that of the diffractive power of the co-planar transmission grating 18 to rotate incident image bearing light towards the exit grating 26.

The exit grating 26 is a low efficiency grating, such that as image bearing light propagates along the light path within the second plate-like waveguide 14, each interaction with the exit grating 26 causes a small proportion of the image bearing light to be diffracted out of the second plate-like waveguide 14. Image bearing light which is not diffracted out of the second plate-like waveguide 14 continues to propagate within the second plate-like waveguide 14. Accordingly, a large number of parallel rays of image bearing light exit the second plate-like waveguide 14 through the exit grating 26 towards the observer, which originated at discrete points on the micro-display forming the image generating light source device.

However, such a prior art projection display results in obscuration of part of the outside world scene as an observer cannot usually see through the first plate-like waveguide or at least the view of the observer through the first plate-like waveguide is significantly reduced.

According to a first aspect of the invention a projection display, for displaying an image to an observer, includes: a first waveguide element arranged to be light transmissive; an image-providing light source device arranged to generate an image and to inject image bearing light into the first waveguide element; a first grating associated with the first waveguide element arranged to direct the image bearing light internally along the first waveguide element and through which the image bearing light is outputted from the first waveguide element; a second waveguide element arranged to be light transmissive and transparent that includes a coupling grating arranged to receive the image bearing light from the first waveguide element and to direct the image bearing light along the second waveguide element; the second waveguide element further includes an exit grating arranged to diffract received image bearing light out of the second waveguide element towards an observer; and wherein the image-providing light source device is arranged to divide the image into two or more sub-images and inject each sub-image into a different input region of the first waveguide element.

In this manner, a projection display includes a smaller dimensioned first waveguide element thereby reducing obscuration of part of the outside world scene due to the size of the first waveguide element. Furthermore, the smaller first waveguide element allows the projection display to fit a smaller space and thus be more suitable for restricted space environments such as an aircraft cockpit or in a helmet or head mounted display. The projection display also has a reduced mass, again increasing the suitability of the projection display for use in an aircraft cockpit or helmet or head mounted display. A smaller first waveguide also allows a smaller coupling grating and thus a reduction in the size of the second waveguide element.

The first grating may be a transmission or reflection type grating.

The image bearing light may have a predefined field of view and each sub-image may correspond to a sub-division of the field of view.

The image-providing light source device may include a pair of 90 degree prisms arranged in the object plane of the image to divide the image bearing light into two sub-images and direct one sub-image to a first channel and to direct the other sub-image to a second channel. The first and second channels may each include a fold mirror arranged to direct an incident sub-image towards the first waveguide element. The first and second channels may each include a collimating lens arrangement arranged to collimate its associated sub-image.

The image-providing light source device may include a diffractive grating arranged in the object plane of the image to divide image bearing light into two sub-images and direct one sub-image to a first channel and to direct the other sub-image to a second channel. The diffractive grating may be transmissive. Alternatively, the diffractive grating may be reflective.

Each input region may be arranged to direct its associated sub-image on to the first grating of the first waveguide element.

The first grating may be arranged such that incident inputted image bearing light is diffracted therefrom with the incidence angle of the diffracted light at internal surfaces of the first waveguide element arranged to be greater that the critical angle for the material from which the first waveguide element is made.

The first grating may be a low efficiency grating.

The coupling grating may be arranged such that incident image bearing light is diffracted therefrom with the incident angle of the diffracted light at internal surfaces of the second waveguide element arranged to be greater than the critical angle for the material from which the second waveguide element is made.

The diffractive power of the coupling grating may be rotated through 90° with respect to the diffractive power of the first grating.

The second waveguide element may include a narrow band selective reflection coating provided on a surface of the second waveguide element parallely spaced from the exit grating, which reflective coating is arranged to reflect light diffracted from the exit grating back to the exit grating.

The first waveguide element and/or the second waveguide element may be curved.

At least one input region may be arranged to inject image bearing light via reflective, or transmissive, or refractive means.

The first waveguide element may be plate-like, the second waveguide element may be plate-like and the first and second waveguide elements may be arranged substantially co-planar to one another.

The first waveguide element and the second waveguide element may be arranged substantially in the same plane. The first waveguide element and the second waveguide element may be formed within a single piece of material.

The projection display may form part of a Head Up Display, or Helmet Mounted Display, or Head Mounted Display.

The invention will now be described, by way of example only, with reference to the accompanying drawings, in which:

FIG. 3 illustrates, in elevation, a prior art first plate-like waveguide;

FIG. 4 illustrates, in elevation, a first waveguide element according to the present invention;

Figure 2:
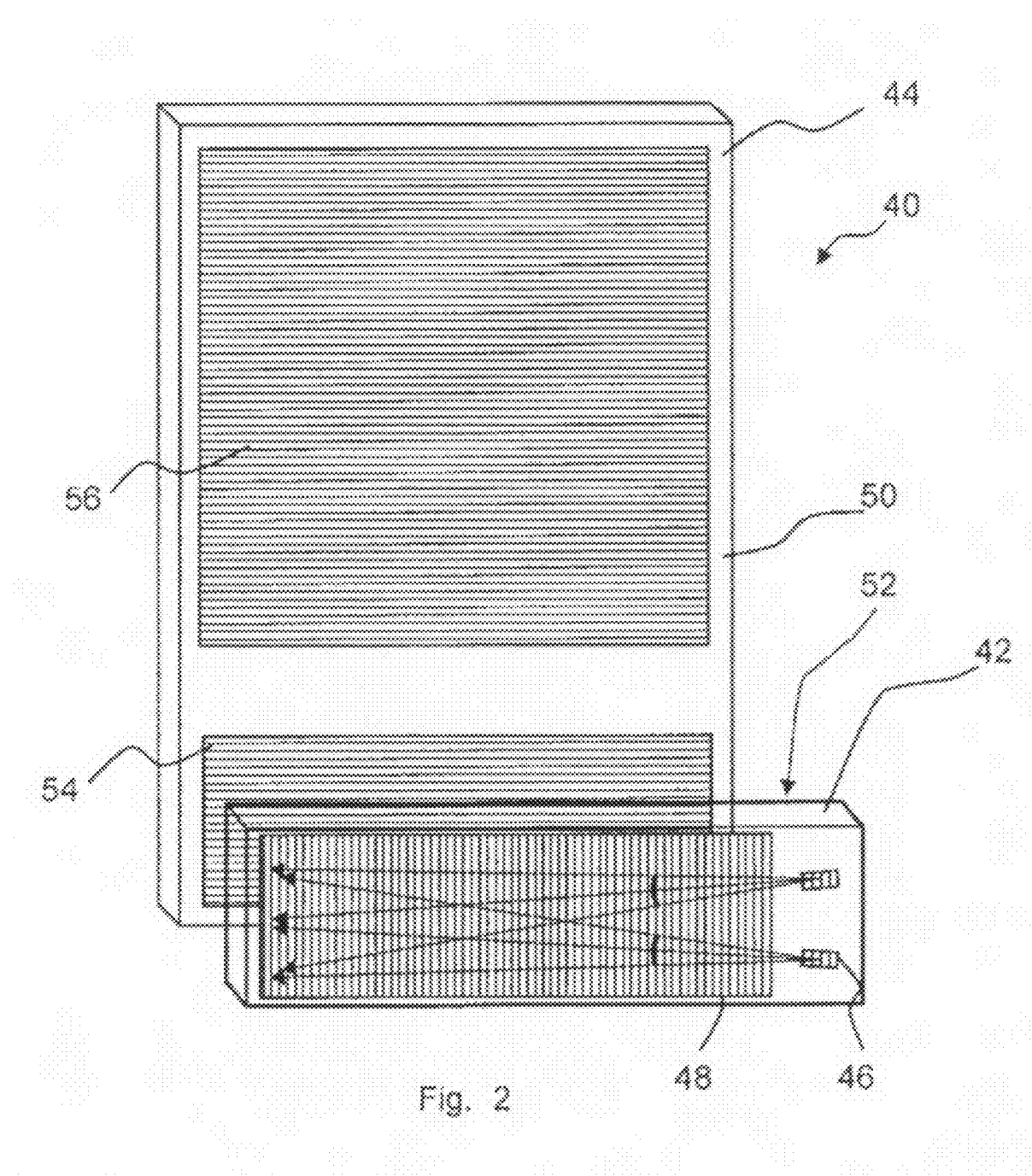
FIG. 2 illustrates, in perspective view, a projection display according to the present invention.

Referring to FIG. 2, there is illustrated a projection display 40 for displaying an image to an observer that uses waveguide techniques to generate a collimated display defining a large exit pupil at the point of an observer and a large field of view, whilst using a small image-providing light source device. The projection display 40 uses a first waveguide element 42, for example formed in a plate-like shape, made of light transmissive material such as glass or plastic and a second waveguide element 44, for example formed in a plate-like shape, made from a light transmissive and light transparent material such as glass or plastic. The projection display 40 additional includes an image-providing light source device, not shown, located to inject image bearing light into the first waveguide element 42 through a first face 46.

The image-providing light source device includes a microdisplay arranged to provide information to be displayed to an observer. Additionally the image-providing light source device includes a collimating optical arrangement located between the micro-display and the first face 46 of the first waveguide element 42. The collimating optical arrangement is operable to collimate light received from the micro-display and to inject the collimated image bearing light into the first waveguide element 42 through the first face 46.

The collimated image bearing light produced by the collimating optical arrangement has a small exit pupil and is fed into the first waveguide element 42, which performs the function of stretching the horizontal pupil of the final display. The output from the first waveguide element 42 is fed into the second waveguide element 44, which is arranged to stretch the vertical pupil of the final display and also to act as a combiner for the projection display 40 through which an observer views an outside world scene with information to be displayed to the observer overlaid on the outside world scene. In this manner, the image to be displayed to the observer looking through the second waveguide element 44 defines a large exit pupil and a large field of view whilst using a small image generating light source.

Image bearing light injected into first waveguide element 42, via first face 46 is incident on a first grating, in this example, a transmission grating 48 arranged internally within the first waveguide element 42 and substantially co-planar with the first face 46. Light impinging on the transmission grating 48 diffracts therefrom such that the incidence angle of the light on the internal surfaces of the first waveguide element 42 is greater than the critical angle for the material from which the first waveguide element 42 is made. The image bearing light is constrained within the first waveguide element 42 to propagate along the first waveguide element 42 reflecting from each internal surface in turn to follow a predefined light path. Thus, the relative field angles of the light incident on the first waveguide element 42 at the first face 46 are preserved within the first waveguide element 42 and the information required to regenerate the original image is preserved.

The transmission grating 48 also serves to output the image bearing light from the first waveguide element 42. The transmission grating 48 is a low efficiency grating which diffracts a small amount of light out of the first waveguide element 42 on each interaction with incident image bearing light.

The second waveguide element 44 is located with a first face 50 co-planar with a second face 52 of the first waveguide element 42 and is arranged to receive the image bearing light exiting the second face 52 of the first waveguide element 42. The second face 52 is co-planar to the first face 46 of the first waveguide element 42. The first face 50 of the second waveguide element 44 is located adjacent and close to the second face 52 of the first waveguide element 42. The second waveguide element 44 includes a coupling grating 54 located therein arranged substantially co-planar to the first face 50 of the second waveguide element 44 and the coupling grating 54 is operable to diffract each impinging ray of image bearing light received from the transmission grating 48 of the first waveguide element 42 at an angle that is larger than the critical angle for the material from which the second waveguide element 44 is made. Accordingly, received image bearing light will propagate inside the second waveguide element 44 to follow a predefined light path. The image bearing light continues along the light path to an exit grating 56 arranged on or within the second waveguide element 44, which is arranged to diffract the received image bearing light out of the second waveguide element 44 towards an observer.

The coupling grating 54 is arranged such that its diffractive power is rotated through 90 degrees to that of the diffractive power of the co-planar transmission grating 48 to rotate incident image bearing light towards the exit grating 56.

The exit grating 56 is a low efficiency grating, such that as image bearing light propagates along the light path within the second waveguide element 44, each interaction with the exit grating 56 causes a small proportion of the image bearing light to be diffracted out of the second waveguide element 44. Image bearing light which is not diffracted out of the second waveguide element 44 continues to propagate within the second waveguide element 44. Accordingly, a large number of parallel rays of image bearing light exit the second waveguide element 44 through the exit grating 56 towards the observer, which originated at discrete points on the micro-display forming the image generating light source device.

Referring again to FIG. 1, it will be observed that the first plate-like waveguide 2 is arranged to expand the horizontal exit pupil of the final display to provide a total field of view 58 which expands over the length of the transmission grating 18 from an input region 60. The height 62 of the first plate-like waveguide 12 is dictated by the required instantaneous field of view required over the width 64 of the final display existing the second plate-like waveguide 14. Accordingly, the height 62 of the first plate-like waveguide 12 of prior projection display 10 is related to the width 64 required for the final display generated by second plate-like waveguide 14.

This results in a projection display 10 having a relatively large first plate-like waveguide 12 through which an observer's view of an outside world scene is obscured. When implemented in a head-up display or helmet or head mounted display this results in an obscuration of the outside world scene and an unfavourable mechanical packaging of the projection display 10.

Figure 1:
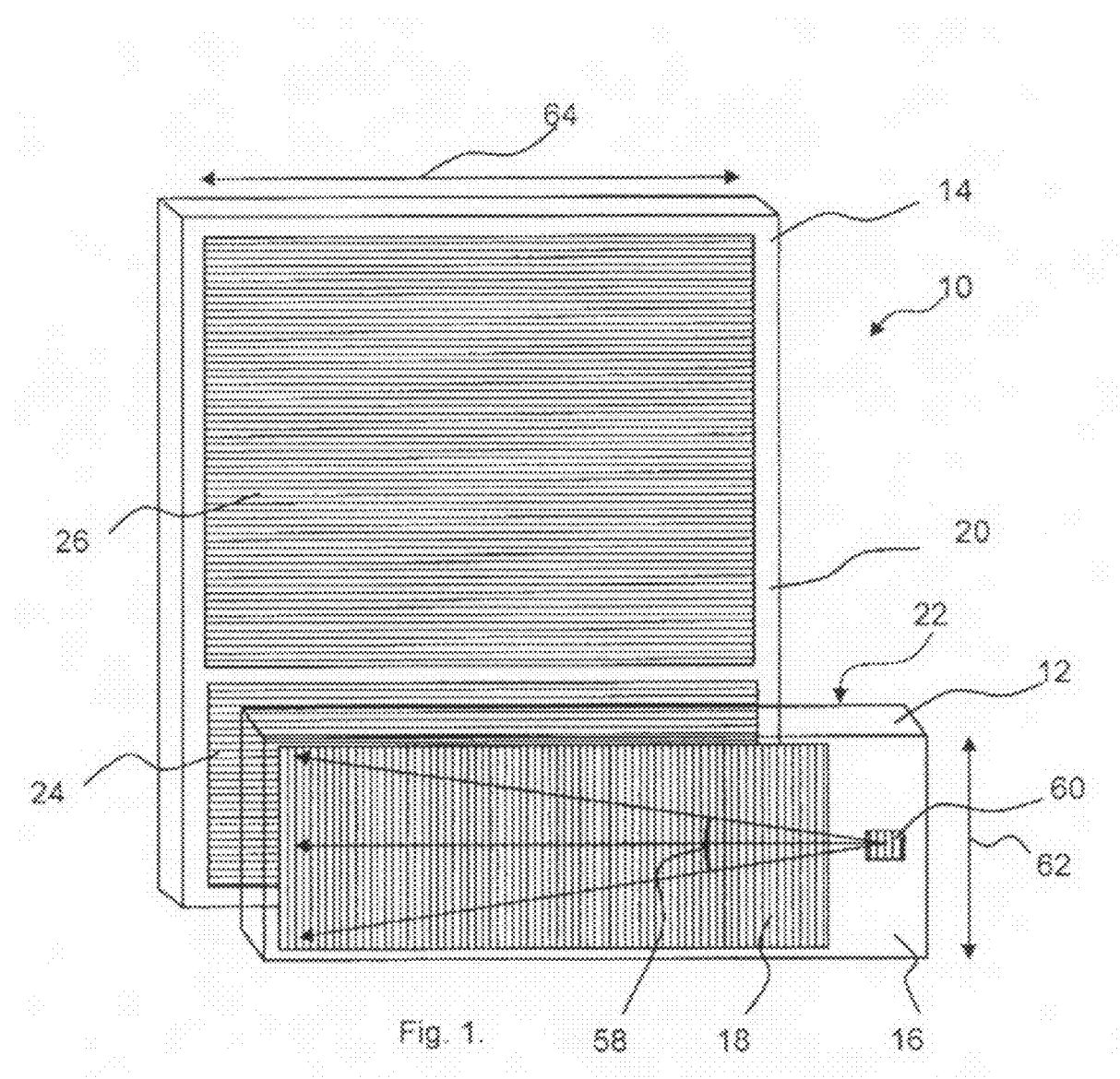
FIG. 1 illustrates, in perspective view, a prior art projection display including co-planar waveguides.

Referring to FIG. 3, wherein like references have been used to indicate similar integers to those described with reference to FIG. 1, a prior art first plate-like waveguide 12 receives image bearing light via input region 60 and the total field of view 58 expands from the input region 60 as it propagates along the length of the transmission grating 18.

However, in accordance with the present invention, the total field of view 58 of the image to be displayed can be split into two sub-images 66 and 68 such that the total field of view 58 is divided into two sub-divisions of the total field of view 58.

Referring to FIG. 4 wherein like references have been used to indicate similar integers to those described with reference to FIG. 2, the image bearing light of a first sub-image 70 is injected into the first waveguide element 42 via a first input region 72 and the image bearing light of a second sub-image 74 is injected into the first waveguide element 42 via second input region 76.

As will be understood, by splitting the total field of view into first and second sub-images 70 and 74 the first waveguide element 42 can be reduced in height 78. As long as the relationship between the internal angle at which image bearing light is reflected within the first waveguide element 42 and the field position of the image to be displayed is maintained then a complete image will be observed by an observer at the output of the second waveguide element 44.

Figure 5:
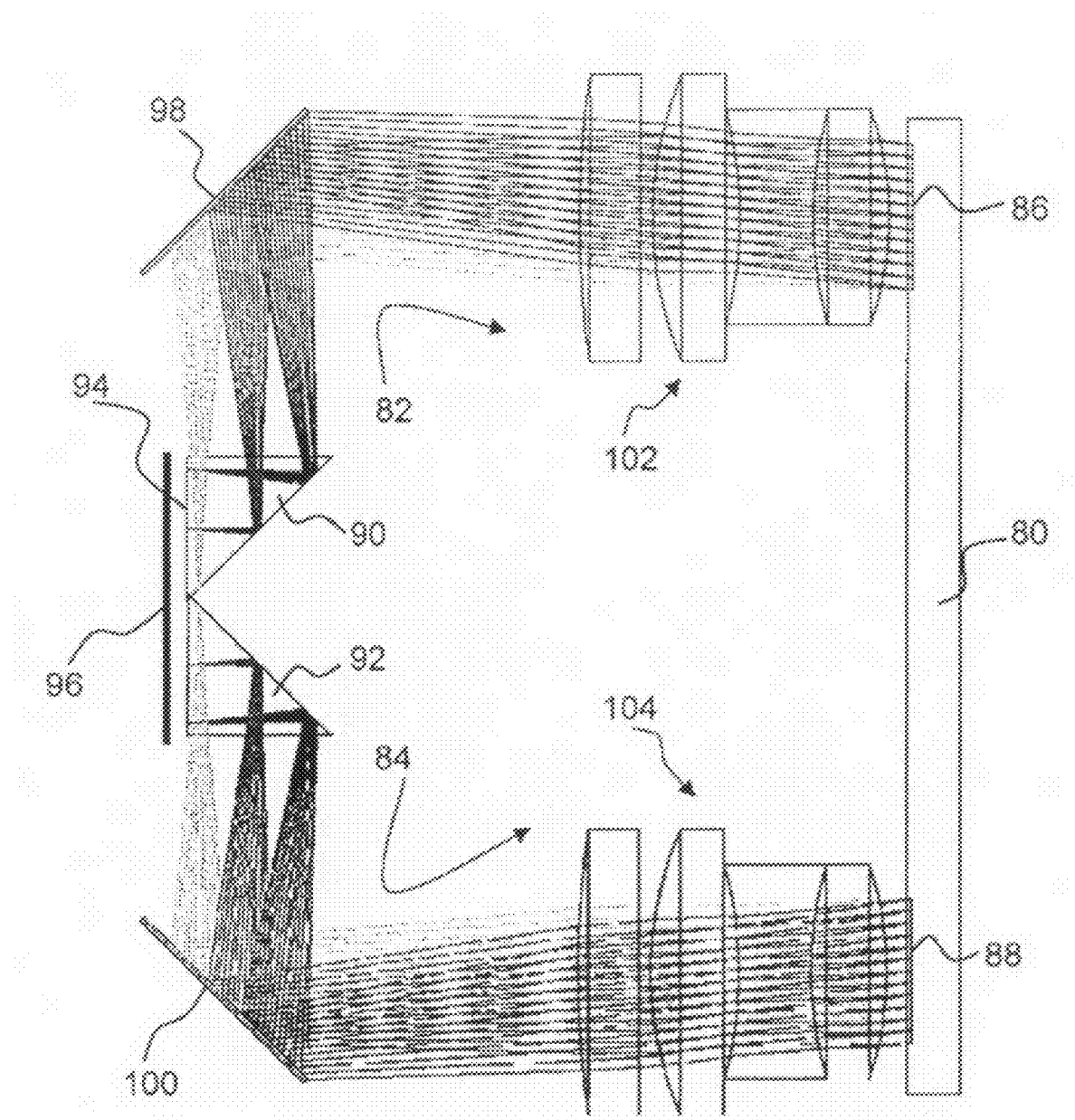
FIG. 5 illustrates, in plan view, a ray trace scheme to inject image bearing light into a first waveguide element according to the present invention.

Referring to FIG. 5, a first waveguide element 80 is fed with first and second sub-images via first and second channels 82 and 84, which inject the sub-images into the first waveguide element 80 via first and second input regions 86 and 88, respectively.

A pair of right angle prisms 90 and 92 are arranged in the object plane 94 of an image-providing light source device 96. The pair of right angle prisms 90, 92 act to divide the image plane of the image-providing light source device 96 into first and second sub-images, one each of which is directed along the first or second channels 82, 84. Each channel 82, 84 includes a fold mirror 98, 100 arranged to direct the image bearing light of the sub-image within the channel 82, 84 towards its respective input region 86, 88.

Each channel 82, 84 includes a collimating lens arrangement 102, 104 arranged to collimate incident image bearing light and to inject collimated image bearing light of the sub-image in the channel 82, 84 into its associated input regions 86, 88.

An additional advantage of reducing the height 78 of the first waveguide element 42 is that this allows a similar reduction in the height of the coupling grating 54 associated with the second waveguide element 44. This results in image bearing light having fewer interactions with the coupling grating 54 as it propagates through the second waveguide element 44. It will be noted, that each interaction with the coupling grating 54 serves to diffract a portion of the image bearing light out of the second waveguide element 44 and that reducing the number of interactions with the coupling grating 54 increases the optical efficiency of the projection display 40. Furthermore, reducing the required height of the coupling grating 54 can also result in a reduction in the overall required height of the second waveguide element 44.

Figure 6:
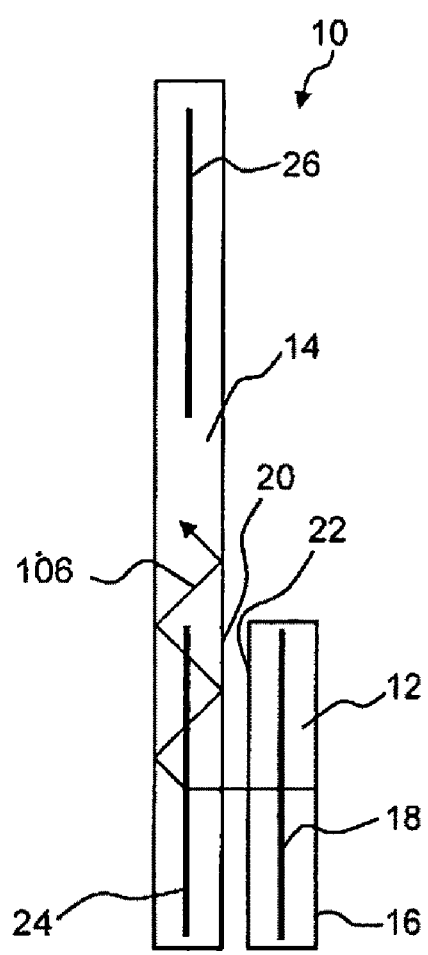
FIG. 6 illustrates, in elevation, a prior art projection display including co-planar plate-like waveguides.

Referring to FIG. 6, wherein like references have been used to indicate similar integers to those described with reference to FIG. 1, and referring to FIG. 7, wherein like references have been used to indicate similar integers to those described with reference to FIG. 2, a comparison of FIG. 6 with FIG. 7 indicates a reduction in the height of the first plate-like waveguide 12 of the prior art projection display 10, illustrated in FIG. 6, and the first waveguide element 42 of the present invention, illustrated in FIG. 7. Furthermore, a comparison of FIG. 6 with FIG. 7 also illustrates that the reduction in the height of the first waveguide element 42 results in a reduction in the height of the coupling grating 54 compared with the coupling grating 24 of the prior art. Consequently, the number of interactions between image bearing light and the coupling grating 54 is reduced, see light path 106 of the prior art in FIG. 6 compared with light path 108 of the present invention in FIG. 7. Light path 106 interacts with the coupling grating 24 three times as it internally reflects within the second plate-like waveguide 14, whereas light path 108 of the present invention interacts twice with the coupling grating 54 as it internally reflects within the second waveguide element 44.

Figure 7:
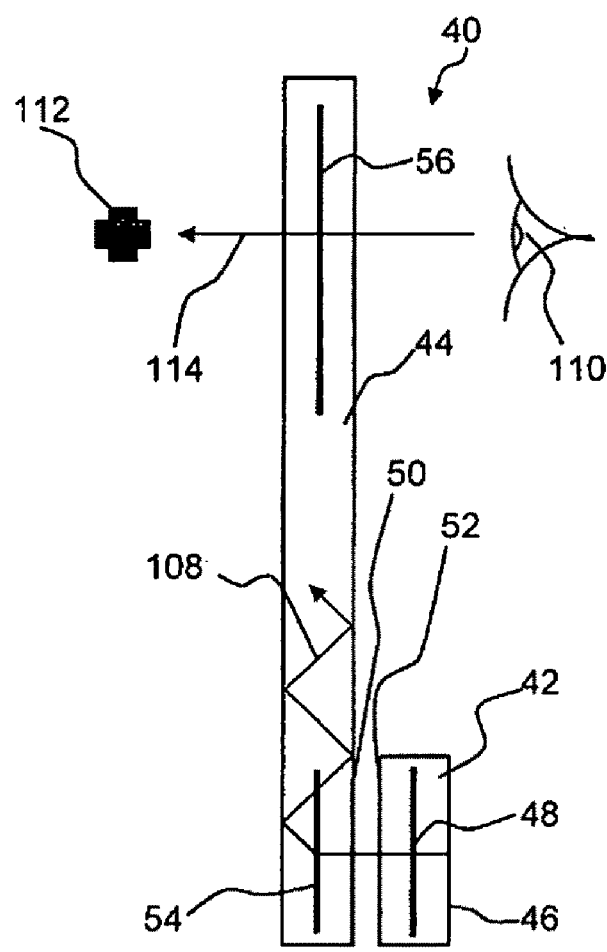
FIG. 7 illustrates, in elevation, a projection display including co-planar waveguide elements according to the present invention.

FIG. 7 also illustrates that an observer 110 views an outside world scene 112 along a line of sight 114 through the second waveguide element 44 and it will be understood that the display to be conveyed to the observer 110 is overlaid on the outside world scene 112.

Figure 8:
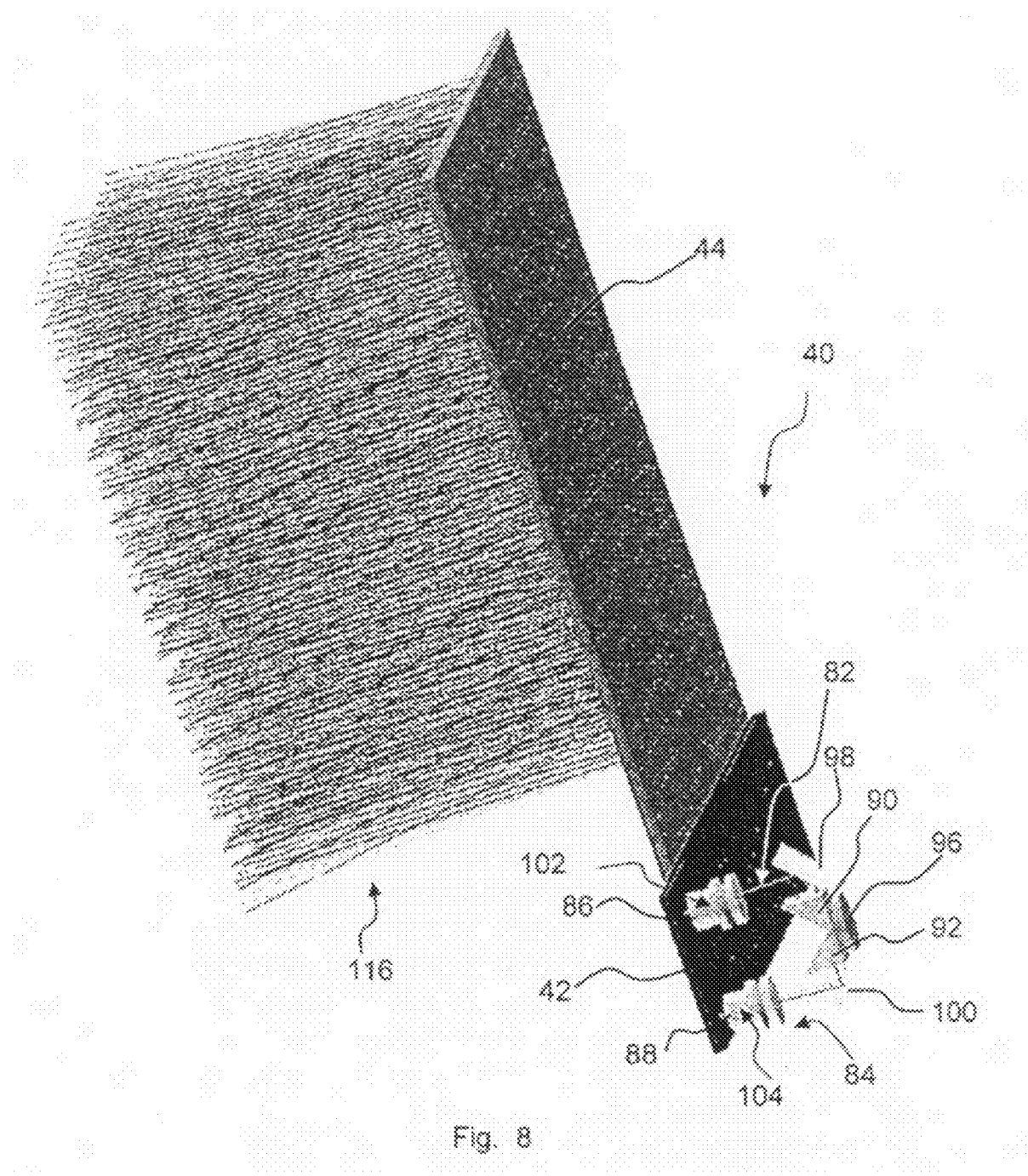
FIG. 8 illustrates, in perspective view, a projection display according to the present invention.

Referring to FIG. 8, in which like references have been used to indicate similar integers to those described with reference to FIGS. 2 and 5, it will be observed that many substantially parallel rays 116 of the image bearing light exit the second waveguide element 44 of the projection display 40 to be viewed by an observer. Each ray 116 originates at a discrete point of the image-providing light source device 96 and follows either the first or second channel 82, 84 via a right angle prism 90, 92, fold mirror 98, 100 and collimating lens arrangements 102, 104 to enter first waveguide element 42 through input regions 86, 88.

Referring again to FIG. 7, it will be understood that the exit grating 56 not only diffracts light towards the observer 110 but also diffracts light away from the observer 110. Preferably, a narrow band selective reflection coating, not shown, is provided on at least part of a second face of the second waveguide element 44 opposite to and parallely spaced from the first face 50 to reflect light diffracted from the exit grating 56 back to the exit grating 56 and observer 110 to increase display efficiency.

Preferably, the coupling grating 54 and/or the formation of the exit grating 56 are such so as to co-operate to generate a multiplicity of overlapping display images. To this end the exit grating 56 can be duplicated within the body of the second waveguide element 44 and additionally at the first face 50 thereof. Furthermore, the coupling grating 54 and the exit grating 56 can have substantially the same spatial frequency, thus cancelling any chromatic aberration introduced by the coupling grating 54. Advantageously, the transmission grating 48, the coupling grating 54 and exit grating 56 can have substantially the same spatial frequency to assist in creating a simple, low cost optical configuration.

It will be noted that the collimating lens arrangements 102, 104 are the only integers of the optical train that include optical power and are arranged to create the image to be displayed, albeit with a small exit pupil. The collimating lens arrangements 102, 104 create collimated image bearing light such that the angle of a ray of the image bearing light exiting the collimating lens arrangements 102, 104 corresponds to a unique position within the total field of view of the image to be displayed. This condition is maintained throughout the pathway of the image bearing light through the first and second waveguide elements 42 and 44 to maintain the image to be displayed.

The first waveguide element 42 and the second waveguide element 44 of the present invention have two purposes: the first is to expand the small exit pupil provided by the collimating lens arrangements 102, 104 in two orthogonal axes; and the second is to act as a combiner structure to present the image be displayed to an observer overlaid on an outside world scene. As each angle inputted into the first waveguide element 42 is maintained as being unique to a particular field position of the image to be displayed, in a continuous manner, then the image to be displayed at the second waveguide element 44 will be maintained.

This frees an optical designer from the usual constraints of design of head up, helmet or head mounted displays. The image to be displayed can be divided into separate field portions, sub-images, and injected into the first waveguide element 42 at any position on the first waveguide element 42 as long as the exit grating 56 is populated with image bearing light.

Although the first waveguide element 42 and the second waveguide element 44 have been shown as planar in the illustrated embodiment of the invention either the first waveguide element 42 and/or the second waveguide element 44, if desired, can be made curved.

It will be understood that an alternative embodiment of the invention could include first and second waveguide elements formed in a single piece of material, such material providing the correct optical properties for each waveguide element. In this case, the first and second waveguide elements can be arranged within the material either co-planar or planar with respect to one another. Such an embodiment would provide easier alignment of the first and second waveguide elements.

The image plane of the image-providing light source device can be divided into more than two sub-images and that such sub-images can be separately injected into an input region associated with a channel arranged to divide the image plane and convey it to the first waveguide element.

The transmission grating 48, coupling grating 54 and exit grating 56 can be formed by suitable holograms and/or semi-reflective surfaces.

Additionally, the projection display illustrated according to the invention can form part of a Head Up Display, of a Helmet Mounted Display and/or of a Head Mounted Display, particularly for aircraft usage.

The invention claimed is:

1. A projection display, for displaying an image to an observer, including:
   a first waveguide element arranged to be light transmissive;
   an image-providing light source device arranged to generate an image and to inject image bearing light into the first waveguide element;
   a first grating associated with the first waveguide element arranged to direct the image bearing light internally along the first waveguide element and through which the image bearing light is outputted from the first waveguide element;
   a second waveguide element arranged to be light transmissive and transparent that includes a coupling grating arranged to receive the image bearing light from the first waveguide element and to direct the image bearing light along the second waveguide element;

the second waveguide element further includes an exit grating arranged to diffract received image bearing light out of the second waveguide element towards an observer; and wherein the image-providing light source device is arranged to divide the image into two or more sub-images and inject each sub-image into a different input region of the first waveguide element.

2. A projection display, as claimed in claim 1, wherein the image bearing light has a predefined field of view and each sub-image corresponds to a sub-division of the field of view.

3. A projection display, as claimed in claim 1, wherein the image-providing light source device includes a pair of 90 degree prisms arranged in the object plane of the image to divide the image bearing light into two sub-images and direct one sub-image to a first channel and to direct the other sub-image to a second channel.

4. A projection display, as claimed in claim 3, wherein the first and second channels each include a fold mirror arranged to direct an incident sub-image towards the first waveguide element.

5. A projection display, as claimed in claim 4, wherein the first and second channels each include a collimating lens arrangement arranged to collimate its associated sub-image.

6. A projection display, as claimed in claim 1, wherein the image-providing light source device includes a diffractive grating arranged in the object plane of the image to divide image bearing light into two sub-images and direct one sub-image to a first channel and to direct the other sub-image to a second channel.

7. A projection display, as claimed in claim 6, wherein the diffractive grating is transmissive.

8. A projection display, as claimed in claim 6, wherein the diffractive grating is reflective.

9. A projection display, as claimed in claim 1, wherein each input region is arranged to direct its associated sub-image on to the first grating of the first waveguide element.

10. A projection display, as claimed in claim 1, wherein the first grating is arranged such that incident inputted image bearing light is diffracted therefrom with the incidence angle of the diffracted light at internal surfaces of the first waveguide element arranged to be greater that the critical angle for the material from which the first waveguide element is made.

11. A projection display, as claimed in claim 1, wherein the first grating is a low efficiency grating.

12. A projection display, as claimed in claim 1, wherein the coupling grating is arranged such that incident image bearing light is diffracted therefrom with the incident angle of the diffracted light at internal surfaces of the second waveguide element arranged to be greater than the critical angle for the material from which the second waveguide element is made.

13. A projection display, as claimed in claim 1, wherein the diffractive power of the coupling grating is rotated through 90° with respect to the diffractive power of the first grating.

14. A projection display, as claimed in claim 1, wherein the second waveguide element includes a narrow band selective reflection coating provided on a surface of the second waveguide element parallely spaced from the exit grating, which reflective coating is arranged to reflect light diffracted from the exit grating back to the exit grating.

15. A projection display, as claimed in claim 1, wherein the first waveguide element is curved.

16. A projection display, as claimed in claim 1, wherein the second waveguide element is curved.

17. A projection display, as claimed in claim 1, wherein at least one input region is arranged to inject image bearing light via reflective, or transmissive, or refractive means.

18. A projection display, as claimed in claim 1, wherein the first waveguide element is plate-like, the second waveguide element is plate-like and the first and second waveguide elements are arranged substantially co-planar to one another.

19. A projection display, as claimed in claim 1, wherein the first waveguide element and the second waveguide element are arranged substantially in the same plane.

20. A projection display, as claimed in claim 19, wherein the first waveguide element and the second waveguide element are formed within a single piece of material.

21. A Head Up Display, or Helmet Mounted Display, or Head Mounted Display including a projection display as claimed in claim 1.

* * * * *